United States Patent [19]

Oakes, Jr.

[11] Patent Number: 4,529,865

[45] Date of Patent: Jul. 16, 1985

[54] ELECTRICALLY HEATED MUSICAL INSTRUMENT STAND

[76] Inventor: Philip B. Oakes, Jr., 1632 Borroughs St., Oceanside, Calif. 92054

[21] Appl. No.: 507,930

[22] Filed: Jun. 27, 1983

[51] Int. Cl.[3] ......................... H05B 3/02; G01G 5/00; F26B 25/00

[52] U.S. Cl. ...................................... 219/201; 34/104; 34/239; 34/243 R; 84/385 A; 84/387 A; 84/453; 219/221; 219/521; 219/523

[58] Field of Search ............... 219/200, 201, 221, 227, 219/242, 385, 520, 521, 523; 84/453, 387 A, 385 B; 34/104, 239, 243 R

[56] References Cited

U.S. PATENT DOCUMENTS

| | | | |
|---|---|---|---|
| 1,639,200 | 8/1927 | Pitts | 219/523 X |
| 1,831,832 | 11/1931 | Wise | 219/200 |
| 2,098,735 | 11/1937 | Yentis | 219/521 |
| 2,439,713 | 4/1948 | Bredice | 219/373 |
| 2,789,200 | 4/1957 | Ebert | 219/364 |
| 2,920,851 | 1/1960 | Carlini | 84/387 A |
| 3,357,666 | 12/1967 | Smith | 84/385 B |
| 3,417,482 | 12/1968 | Peet | 34/104 |
| 3,559,300 | 2/1971 | Fox | 34/104 |
| 3,637,070 | 1/1972 | Friedman | 84/453 X |
| 4,145,950 | 3/1979 | Glantz | 84/385 B |
| 4,161,131 | 7/1979 | Blayman | 84/453 |
| 4,304,166 | 12/1981 | Stefano et al. | 84/453 X |
| 4,407,182 | 10/1983 | Biasini | 84/453 |

FOREIGN PATENT DOCUMENTS

| | | | |
|---|---|---|---|
| 717235 | 10/1954 | United Kingdom | 34/104 |

*Primary Examiner*—A. Bartis
*Attorney, Agent, or Firm*—John J. Murphey

[57] ABSTRACT

An electrically heated musical instrument stand for supporting an idle musical instrument during breaks or pauses during a musical performance for heating the interior of the instrument maintain the idled instrument warm and at its tuned temperature ready for immediate use includes an adjustable support base provided with an upwardly extending adjustable stem insertable into the bell of a musical instrument supported by an adjustable circular stop carried by the stem and engageable with the bell of the instrument. The stop is so positioned that a thermostatically controlled electric heater, including a resistance element enclosed in a cylindrical safety shield, mounted atop the stem is located substantially entirely within the interior of an instrument supported on the stand to provide radiant and naturally convective heat to the interior of the instrument. The heater thermostat is adjustable to provide regulated temperatures to a wide variety of instruments. A thermal insulator is provided atop the heater shield for thermally insulating any points of contact between the heater and instrument.

19 Claims, 3 Drawing Figures

FIG. 2
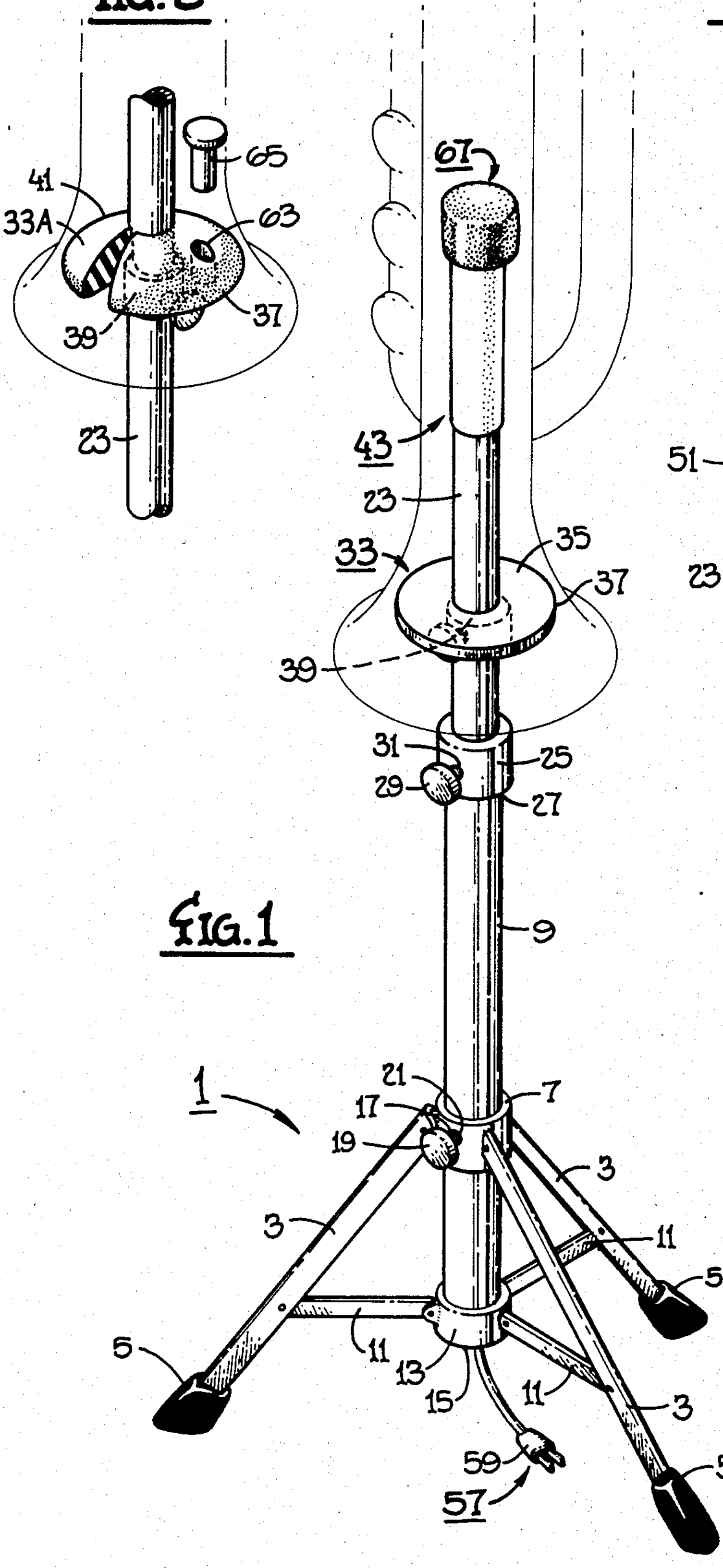
FIG. 1
FIG. 3
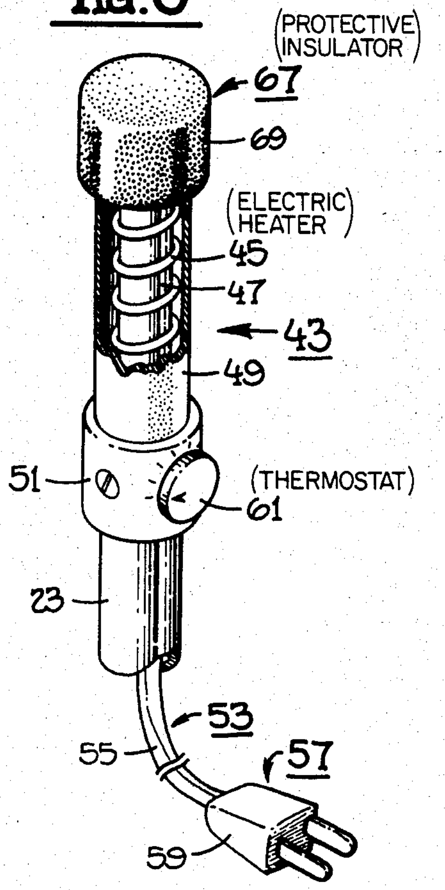

ELECTRICALLY HEATED MUSICAL INSTRUMENT STAND

BRIEF SUMMARY OF THE INVENTION

This invention relates to the field of musical instruments; more particularly, it relates to the field of musical instrument accessories, those known as musical instrument stands. These stands are the ones used for holding the instrument on a stage during performances by a musician as opposed to long-term storage of the instrument such as for shipment, etc.

All musical instruments produce musical tones by vibration of something such as a string, a drum head or an air column. Air column vibrational instruments, generically known as brass and woodwinds, are powered by aveolar air and are hand-held, meaning that during use they are warmed by the breath and the hand to a temperature somewhat above room temperature. A musician always tunes his/her instrument at the temperature reached during play, realizing however, that any substantial temperature change will make the instrument go "flat" or "sharp".

Problems arise when the instrument is idled or its use is temporarily interrupted during a performance. Instruments are idled during a break or pause in performance and during performance by a "doubler" i.e., a musician who plays more than one instrument during a performance. Air conditioned atmosphere, such as in a night club, or outdoor temperatures during outdoor performances are many times much cooler than the "tuned" temperature. Brass and other metals of which musical instruments are made are very efficient heat transfer mediums and their thin-walled, usually elongated shapes make them ideal heat exchangers. Thus, it often occurs, and it is well-known in the industry, that a temporarily idled musical instrument, especially a brass instrument will quickly cool set idle and thereafter be "flat" until rewarmed to the tuned temperature—usually, a matter of a few minutes or so. Since retuning takes time away from playing, the cooled instrument's flatness detracts from the musician's performance.

In addition, the energy used to reheat the cooled instruments comes in large part from the performer's breath. The heat transferred from body temperature air to the cooler brass instrument produces unwanted moisture condensation in the interior of the instrument that can cause sticky valves and plugged tubes as well as being asthetically undesirable.

This invention comprises a novel musical instrument stand that overcomes the above-identified problems. A heating element is provided as part of a novel stand configuration to produce radiant, and in some cases, convectional heat to the interior of the instrument to maintain the idled instrument warm and at its tuned temperature, ready for immediate use. The heat is applied evenly and in a location on the instrument well away from valves and other intricate mechanisms so that no damage is caused by the heating or heating element. Thus the instrument is kept warm, in tune and ready for immediate use. Additionally, the elimination of reheating the instrument also eliminates the aforementioned moisture problem. Adjustments are proposed to the stand to make it useful for a wide variety of sizes and shapes of instruments.

Accordingly, one of the main objects of this invention is to provide a stand that will maintain a temporarily idled musical instrument in a warm, tuned and readyto-use condition. Another object is to reduce significantly or eliminate the warm-up time and flatness of a temporarily idled instrument. A further object of the invention is to substantially reduce moisture buildup in the interior of an instrument when used after an idle period. A still further object of this invention is a stand that is useful for holding and warming a wide variety of instruments. Finally, another object of the invention is a stand that is safe as well as silent in its use of radiant and convection heat. These and other objects will become more apparent when one reads the following description of the preferred embodiment together with the drawings and claims appended hereto.

DESCRIPTION OF THE DRAWINGS

FIG. 1 shows a perspective view of one of the preferred embodiments of this invention.

FIG. 2 shows a close-up view of one part of the stand and another embodiment therein.

FIG. 3 shows a close-up view of another part of the stand and another embodiment therein.

DETAILED DESCRIPTION OF THE INVENTION

FIG. 1 shows a preferred embodiment of the musical instrument stand of this invention comprising a stand support base 1 which may take a variety of forms. Here, base 1 is comprised of a plurality of base legs 3 having foot pads 5 at one end thereof and being all pivotally connected at their other ends to a collar 7 which is in turn slidably received on a vertical base post 9. A short arm 11 is pivotally connected between each leg 3 and another collar 13 that is anchored at the bottom end 15 of base post 9. A threaded screw 17, having an outer adjustment knob 19 penetrates collar 7 through a threaded hole 21 to contact post 9 and provide a means of adjusting the relative height and spread of legs 3 by sliding collar 7 up and down post 9 to form a stationary stand base to handle a wide variety of sizes and shapes of musical instruments.

An instrument support stem 23 extends upward from base 1, slidably carried inside base post 9 and adjustable to various heights by an adjustment collar 25, anchored at base post top end 27, through which a knob-ended screw 29 penetrates in threaded engagement with a receiving hole 31. Stem 23 receives thereover the wide end or bell of a musical instrument such as a trumpet, coronet, fluglehorn, bugle, clarinet, flute, etc.

A stop 33 is provided to support the musical instrument on base 1. Although it may take many forms, from a simple crosspiece to an elaborate, decorative ball, it is shown here as a plate 35 having a circular outer edge 37 concentrically received on stem 23 and held thereon by an adjustable collar 39. This preferred circular shape of stop 33 engages in full contact with the circumference of the bell or funnel end of an instrument to prevent damage to the thin metallic wall thereof. As shown in FIG. 2, stop 33A can additionally have a round upper resilient surface 41 for even more gentle contact with the bell of the musical instrument to prevent unwanted dimples and scars on the instrument when it is placed over stem 23 and set down sharply on stop 33.

An electric heater 43, comprising a wire wound heating element 45 on a tubular ceramic support 47 housed in a safety shield 49, is operably inserted inside the bell of the positioned musical instrument, and is received on or preferrably mounted atop of stem 23 by any convenient connection mechanism, shown here by an adjustable collar 51. Means 53 for energizing heater 43, such as an electrical cord 55, extends from element 45 to a disconnect means 57, shown in FIG. 1 as a disconnect plug 59, to provide an easy method of connecting up the stand to any convenient electrical outlet.

Heating element 43 is shown in FIG. 3 to be connected to an electric thermostat 61 to provide a safe, constant but controllable level of heat to the bell area of instrument positioned on the stand. As stop 33 engages the full circumference of the bell of the musical instrument, there is little room for air passage through the bell and the heating is mostly in the form of radiant heat. This is a desirable feature and is especially useful with woodwinds such as a clarinet, to keep the reed from drying out. When convection heating is desired, for instance in the case of a trumpet, to provide a slight drying capacity to the heating element, an aperture 63 may be made through stop 33 interior of circular edge 37 (see FIG. 2) to allow air to pass upward into the bell area thus providing some convection heating as well. A simple plug 65 may be used to stop the air flow when it is not desired.

Insulator means 67 is provided, preferrably at the top end of shield 49 to prevent contact between the musical instrument and heater 43 such as might be caused in the case of inadvertent bumping or jostling of the stand or instrument. As most musical instruments are highly polished and have lacquer finishes, any contact with a heat source might discolor or dull the finish. Means 67 is shown to comprise a simple rubber bumper 69 surrounding the top of heater 43; other insulators in various configurations may be used such as a foam bumper or a papier mache ring, etc., as long as they are interposed between heater 43 and the musical instrument.

What is claimed is:

1. A musical instrument stand comprising:

(a) a support base;

(b) a stem extending upward a finite distance from said base for receipt thereover of a hollow musical instrument having an opening into which the stem is inserted;

(c) a stop on said base adapted to support the musical instrument received over said stem;

(d) an electric heater, including means for providing energy thereto, operably mounted on top of said stem for substantially complete insertion inside the musical instrument received over the stem to provide natural convection and radiant heat inside the musical instrument to keep the instrument warm and in tune during idle periods; and, (e) a thermostat on said heater and operably connected in circuit with said means for providing energy to said heater to provide regulated temperatures to a wide variety of instruments.

2. The musical instrument stand of claim 1 including means on said heater for thermally insulating the points of contact between the musical instrument and said electric heater.

3. The musical instrument stand of claim 1 including means for adjusting said base to provide support for a wide variety of instruments.

4. The musical instrument stand of claim 1 including means for adjusting said stem on said base to provide support for a wide variety of musical instruments.

5. The musical instrument stand of claim 1 including an aperture in said stop to permit air currents to pass therethrough and provide convection heating to the musical instruments.

6. The musical instrument stand of claim 1 including disconnect means to disconnect energy providing means from an energy source.

7. The musical instrument stand of claim 1 wherein said stop is affixed to said stem.

8. A musical instrument stand comprising:

(a) a stationary support base;

(b) an instrument support stem extending upward a finite distance therefrom for receipt thereover of the bell of a musical instrument;

(c) a circular stop on said stem, above said base, to support the musical instrument on said base;

(d) an electric heater, including means for providing energy thereto, operably mounted on the top of said stem for substantially complete insertion inside the musical instrument to provide natural convection and radiant heat inside the musical instrument to keep the instrument warm and in tune during idle periods;

(e) a thermal insulator interposed between said heater and the musical instrument to prevent direct contact therebetween; and, (f) a thermostat on said heater operably connected in circuit with said means for providing energy to said heater to provide regulated temperatures to a wide variety of instruments.

9. The musical instrument stand of claim 8 including means for adjusting said base to provide support for a wide variety of instruments.

10. The musical instrument stand of claim 8 including means for adjusting said stem on said base to provide support for a wide variety of instruments.

11. The musical instrument stand of claim 8 including an aperture in said stop to permit air currents to pass therethrough and provide convection heating to the musical instruments.

12. The musical instrument stand of claim 8 including disconnect means to disconnect said energy providing means from an energy source.

13. The musical instrument stand of claim 8 wherein said stop has a rounded upper surface for contact with the bell of a musical instrument.

14. A musical instrument support stand comprising:

(a) a stationary support stand;

(b) an instrument support stem extending upward therefrom for receipt thereover of the bell portion of a musical instrument;

(c) a circular stop containing a rounded upper contact surface concentrically received on said stem for engagement with the bell portion of a musical instrument;

(d) an electric heater including an electric heating element operably housed in a safety shield, and having means for providing electrical energy to said element, said heater being mounted atop said stem for substantially complete insertion inside the musical instrument to provide natural convection and radiant heat inside the musical instrument to keep the instrument warm and in tune during idle periods;

(e) a thermal insulator mounted atop said heating element to prevent contact between said element and the musical instrument; and, (f) a thermostat on said heater operably connected in circuit with said means for providing energy to said element to provide regulated temperatures to a wide variety of musical instruments.

15. The musical instrument stand of claim 14 including means for adjusting said base to provide support for a wide variety of instruments.

16. The musical instrument stand of claim 14 including means for adjusting said stem on said base to provide support for a wide variety of instruments.

17. The musical instrument of claim 14 including an aperture in said stop to permit air currents to pass therethrough and provide convection heating to the musical instruments.

18. A heated support for a musical instrument stand comprising:

(a) an elongated hollow tube, adapted to fit onto the support post of a musical instrument stand;

(b) a stop on said hollow tube for supporting the musical instrument thereon; and, (c) an electric heater, including means for providing energy thereto, operably mounted on the upper end of said hollow tube; wherein, (d) said stop is so positioned on said hollow tube that said heater is located substantially within the interior of the musical instrument to provide natural convection and radiant heat into the interior of the instrument to keep the instrument warm and in tune during idle periods.

19. The heated support of claim 18 including means for thermally insulating contact between the musical instrument and said electric heater.

* * * * *